Patented May 3, 1932

1,856,710

UNITED STATES PATENT OFFICE

GEORG KRÄNZLEIN, MARTIN CORELL, AND HEINRICH VOLLMANN, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

PROCESS OF PREPARING VAT DYESTUFFS

No Drawing. Application filed May 3, 1929, Serial No. 360,327, and in Germany May 2, 1928.

The present invention relates to new vat dyestuffs of the 3.4.8.9-dibenzpyrene-5.10-quinone series and to a process of preparing the same.

We have found that halogenated 3.4.8.9-dibenzpyrene-5.10-quinones are converted into clearer and faster vat dyestuffs by treating them with an alkaline oxidizing agent, for instance with sodium hypochlorite. The dyestuffs thus obtained have more valuable properties than the dyestuffs not treated with an alkaline oxidizing agent. They possess, for instance, in general a higher fastness to washing.

The following examples serve to illustrate our invention but they are not intended to limit it thereto, the parts being by weight.

1. 40 parts of pure 3.4.8.9-dibenzpyrene-5.10-quinone (crystallized for instance from nitrobenzene) are dissolved in 400 parts of chlorosulfonic acid to which some iodine has been added. At a temperature of from 85° C. to 90° C. 44 parts of bromine are added drop by drop and the solution is then heated for 12 hours. After the mass has been introduced into water, filtered by suction and washed until neutral, the press-cake formed is suspended in 1000 parts of water and 200 parts of an alkaline sodium-hypochlorite solution and heated on the water bath for about 3 to 4 hours, while well stirring. During this operation the tint of the dyestuff becomes clearer. The dyestuff, after being worked up in the usual manner, has the following formula:

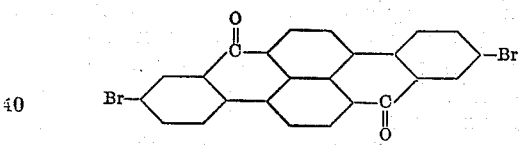

It dissolves in concentrated sulfuric acid to a reddish-blue solution and dyes cotton from a red vat bright golden-orange tints.

2. 40 parts of pure 3.4.8.9-dibenzpyrene-5.10-quinone are dissolved in 400 parts of chlorosulfonic acid to which 2 parts of sulfur have been added and into this solution a current of chlorine, being as constant as possible, is introduced for 15 to 20 hours at a temperature of between 85° C. and 90° C. Thereupon the solution is poured into water and worked up in the usual manner. The isolated dyestuff is suspended in 1000 parts of water and about 300 parts of an alkaline sodium-hypochlorite solution and heated on the water bath for 3 to 4 hours, while well stirring. The dyestuff, after being worked up in the usual manner, has the constitution of a dichloro-dibenzpyrene-5.10-quinone, dissolves in concentrated sulfuric acid to a reddish-blue solution and dyes the vegetable fiber from a red vat bright yellow tints of excellent fastness properties. It possesses most probably the following structural formula:

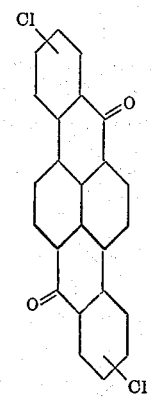

3. 40 parts of pure 3.4.8.9-dibenzpyrene-5.10-quinone are dissolved in 400 parts of chlorosulfonic acid to which about 2 parts of iodine have been added. At a temperature of 90° C. 22 parts of bromine are added drop by drop and the solution is then heated for about 20 hours. After the mass has been introduced into water, filtered by suction and washed until neutral, the press-cake formed is suspended in 1000 parts of water and 200 parts of an alkaline sodium-hypochlorite solution and heated on the water bath for about 3 to 4 hours, while well stirring. During this operation the tint of the dyestuff becomes clearer. The dyestuff worked up in the usual manner is identical with that obtained according to Example 1.

4. 40 parts of pure 3.4.8.9-dibenzpyrene-5.10-quinone are dissolved in 400 parts of chlorosulfonic acid to which 4 parts of sulfur have been added and chlorine is introduced into the solution at a temperature of about 95° C. until its amount has reached the weight necessary for the dichlorination. Thereupon the mass is poured into water and worked up in the usual manner. The isolated dyestuff is suspended in 1000 parts of water and about 300 parts of an alkaline sodium-hypochlorite solution and heated on the water bath for 3 to 4 hours, while well stirring. The dyestuff worked up in the usual manner is identical with that obtained according to Example 2.

5. 49 parts of bromo-3.4.8.9-dibenzpyrene-5.10-quinone (obtained according to Example 1) are dissolved in 500 parts of chlorosulfonic acid, while stirring, 1 part of iodine is added and chlorine is introduced at between 80° C. and 90° C. in such amount that the weight of the solution is increased for 15 to 20 parts. After the pure blue solution of chlorosulfonic acid has been poured into 500 parts of concentrated sulfuric acid, the mass is poured on ice. The dyestuff which separates in the form of yellow flakes is isolated in the usual manner. Thereupon the dye-paste is suspended in 2000 parts of water and 200 parts of an alkaline sodium-hypochlorite solution and heated on the water bath for 2 to 3 hours, while stirring. During this operation the tint of the dyestuff becomes clearer. The pure dyestuff thus obtained crystallizes from nitrobenzene in the form of yellow needles and dyes the vegetable fiber from a violet vat fast yellow tints. It possesses most probably the following formula:

6. When introducing into the solution prepared according to Example 5 only about 10 parts of chlorine and treating the isolated dyestuff on the water bath with an alkaline sodium-hypochlorite solution, a dyestuff is obtained which dyes the vegetable fiber from a violet-red vat yellow tints of the shade of the unsubstituted 3.4.8.9-dibenzpyrene-5.10-quinone. It possesses most probably the following structural formula:

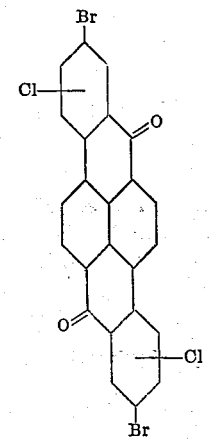

The alkaline sodium hypochlorite solution used in the preceding examples contains 8–12% of active chlorine.

We claim:

1. The process which comprises heating a halogenated 3.4.8.9-dibenzpyrene-5.10-quinone with an alkaline sodium hypochlorite solution at between about 90 and 100° C.

2. The process which comprises heating a di-halogenated 3.4.8.9-dibenzpyrene-5.10-quinone with an alkaline sodium hypochlorite solution at between about 90 and 100° C.

3. The process which comprises heating a di-bromo 3.4.8.9-dibenzpyrene-5.10-quinone with an alkaline sodium hypochlorite solution at between about 90 and 100° C.

4. The process which comprises heating a di-bromo 3.4.8.9-dibenzpyrene-5.10-quinone with an alkaline sodium hypochlorite solution at between about 90 and 100° C. for about 3–4 hours, while stirring.

5. As new compounds, the dyestuffs obtainable by heating a halogenated 3.4.8.9-dibenzpyrene-5.10-quinone with an alkaline sodium hypochlorite solution at between about 90 and 100° C., the said dyestuffs being substantially pure products and being characterized by clear tints and a high fastness to washing.

6. As new compounds, the dyestuffs obtainable by heating a di-halogenated 3.4.8.9-dibenzpyrene-5.10-quinone with an alkaline sodium hypochlorite solution at between about 90 and 100° C., the said dyestuffs being substantially pure products and being characterized by clear tints and a high fastness to washing.

7. As new compounds, the dyestuffs obtainable by heating a di-bromo 3.4.8.9-dibenzpyrene-5.10-quinone with an alkaline sodium hypochlorite solution at between about 90 and 100° C. for about 3-4 hours, while stirring, the said dyestuffs dissolving in concentrated sulfuric acid to a reddish-blue solution and dyeing cotton from a red vat bright golden-orange tints of high fastness to washing.

8. As a new compound, the dyestuff obtainable by heating a dibromo-3.4.8.9-dibenzpyrene-5.10-quinone of the following formula:

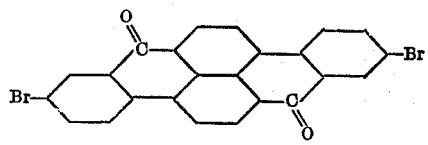

with an alkaline sodium hypochlorite solution at between about 90 and 100° C. for about 3-4 hours, while stirring, the said dyestuff dissolving in concentrated sulfuric acid to a reddish blue solution and dyeing cotton from a red vat bright golden-orange tints of high fastness to washing.

9. As a new compound, the dyestuff obtainable by heating a dichlor-3.4.8.9-dibenzpyrene-5.10-quinone of the following formula:

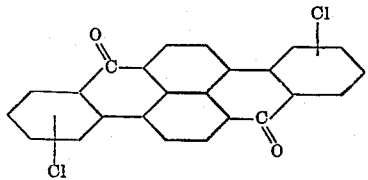

with an alkaline sodium hypochlorite solution at between about 90 and 100° C. for about 3-4 hours, while stirring, the said dyestuff dissolving in concentrated sulfuric acid to a reddish blue solution and dyeing cotton from a red vat bright yellow tints of high fastness to washing.

In testimony whereof, we affix our signatures.

GEORG KRÄNZLEIN.
MARTIN CORELL.
HEINRICH VOLLMANN.